J. HOWARD.
SUPPORTING HOOK.
APPLICATION FILED JAN. 27, 1911.
1,005,838.
Patented Oct. 17, 1911.
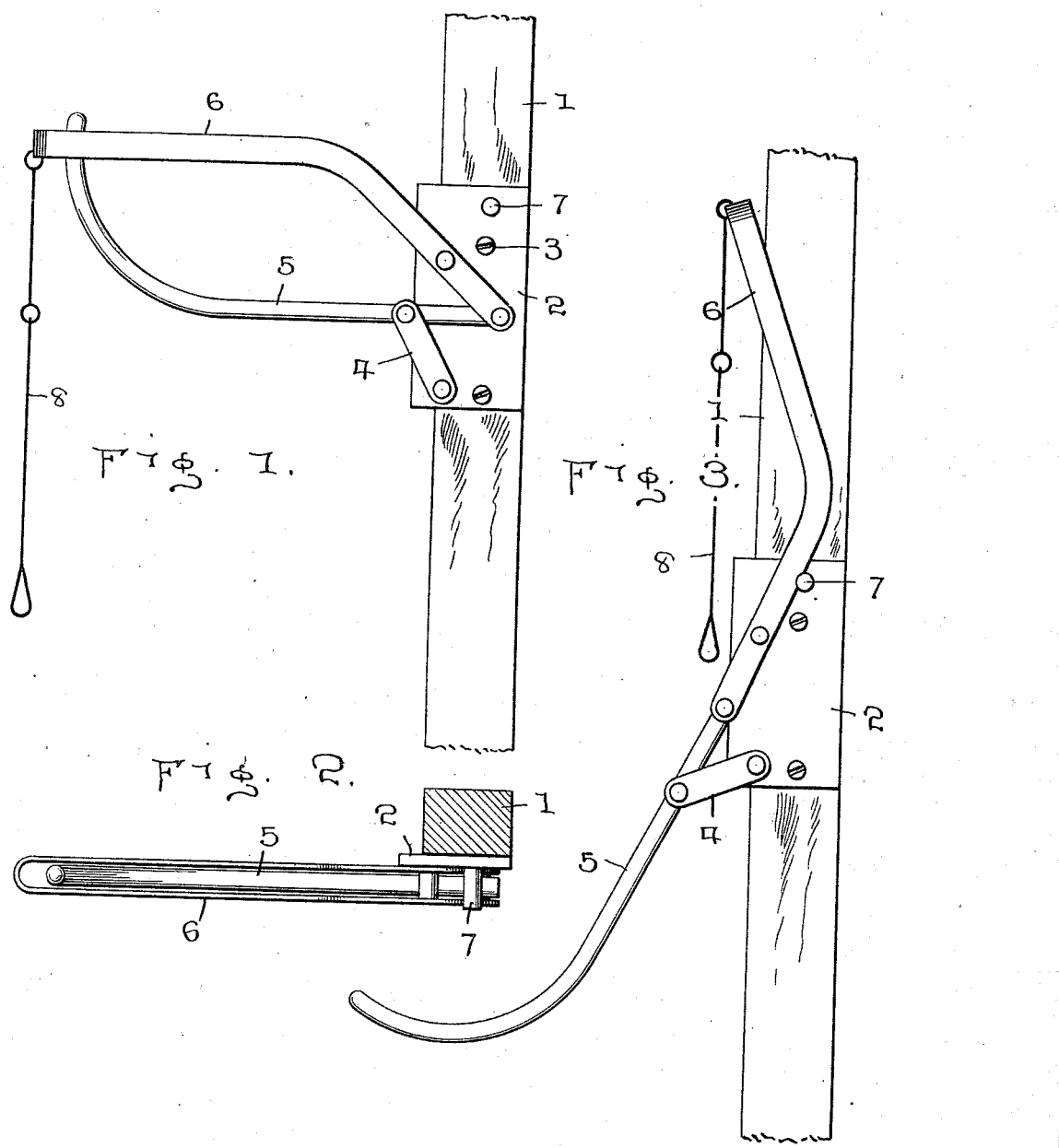

UNITED STATES PATENT OFFICE.

JOHN HOWARD, OF ALBION, NEBRASKA.

SUPPORTING-HOOK.

1,005,838.  Specification of Letters Patent.  Patented Oct. 17, 1911.

Application filed January 27, 1911. Serial No. 605,127.

*To all whom it may concern:*

Be it known that I, JOHN HOWARD, a citizen of the United States, residing at Albion, in the county of Boone and State of Nebraska, have invented certain new and useful Improvements in Supporting-Hooks; and I do hereby declare the following to be a full, clear, and exact description of the invention, such as will enable others skilled in the art to which it appertains to make and use the same.

My invention relates to new and useful improvements in supporting hooks and more particularly to that class adapted to be used for supporting harness or similar devices and my object is to provide means for pivotally and movably attaching the hook to a stationary object.

A further object is to provide means for retaining the hook in an elevated position when desired; and, a further object is to provide means for limiting the swinging movement of the hook.

Other objects and advantages will be hereinafter set forth and pointed out in the specification.

In the accompanying drawings, which are made a part of this application, Figure 1 is a side elevation of the hook applied to use and in its elevated position. Fig. 2 is a top plan view thereof, and, Fig. 3 is a side elevation, showing the hook in its lowered or open position.

Referring to the drawings in which similar reference numerals designate corresponding parts throughout the several views, 1 indicates a stationary object, to which is attached a plate 2 which is secured to the stationary object by screws 3 or in any suitable manner. Pivotally secured to the plate 2 is a strap 4, and to the opposite end of said strap is pivotally secured a hook 5, the pivotal point of said strap with the hook being at a point adjacent the inner end of the hook.

The outer end of the hook is curved upwardly, and, when in its elevated position, is adapted to be engaged by a link 6, the inner end of the link being extended at an angle to the remaining portion thereof and pivoted to the plate 2, while the extreme inner end of the link is pivoted to the extreme inner end of the hook 5. By pivotally securing the inner ends of the link and hook together and placing the pivotal points of the link with the plate and the hook with the strap a distance from the pivotal connection between the link and hook, the hook will be securely held against downward swinging movement when the link is lowered into engagement therewith. When it is desired to lower the hook so that the harness or other objects can be placed thereon or removed therefrom, the link is moved upwardly, which will result in swinging the end of the strap pivoted to the hook in the arc of a circle and lowering the free end of the hook to the position shown in Fig. 3. The swinging movement of the link and hook in one direction is regulated by placing a stop pin 7 on the plate 2 against which the link swings when it is in its open position. When the hook is raised to an elevated position and weight applied thereto, it directs a leverage against the link 6 and prevents the link and hook from casually swinging open, while in lowering the hook it is only necessary to elevate the link a sufficient distance to move the pivoted ends of the link and hook beyond the center of gravity, when the hook will move downwardly by the weight thereon. The link 6 is also used as a lever for raising the hook to a horizontal position so that although a considerable weight may be on the hook, it can be easily elevated. A rod or chain 8 may be secured to the outer end of the link 6 so that the same may be easily reached and operated.

What I claim is:

1. In a device of the class described, the combination with an anchored plate, of a strap having one of its ends pivoted thereto, a hook pivoted to the opposite end of the strap and extending on opposite sides thereof and a link pivoted in its length to said plate and having one of its ends pivoted to the inner end of the hook, said pivotal connections being so arranged that the hook will direct pressure against the link when the link and hook are in their closed position.

2. In a device of the class described, the combination with a plate, of a strap pivoted at one end to the plate, a hook pivoted to the opposite end of the strap and extending on opposite sides thereof, a link having its inner end disposed at an angle and pivoted to the plate, the extreme inner end of the link being pivoted to the inner end of the hook, an operating lever secured to the opposite end of said link and a pin to regulate the swinging movement of the link and hook.

In testimony whereof I have signed my name to this specification in the presence of two subscribing witnesses.

JOHN HOWARD.

Witnesses:
LAURA M. CACY,
O. M. NEEDHAM.

Copies of this patent may be obtained for five cents each, by addressing the "Commissioner of Patents, Washington, D. C."